(12) United States Patent
Vancina (10) Patent No.: US 8,409,422 B2
(45) Date of Patent: Apr. 2, 2013

(54) METHOD AND APPARATUS FOR PRODUCING HYDROGEN AND OXYGEN GAS

(75) Inventor: Robert Vancina, Patterson Lakes (AU)

(73) Assignee: Hope Cell Technologies Pty Ltd, Patterson Lakes, Victoria (AU)

( * ) Notice: Subject to any disclaimer, the term of this patent is extended or adjusted under 35 U.S.C. 154(b) by 398 days.

(21) Appl. No.: 12/992,928

(22) PCT Filed: May 16, 2008

(86) PCT No.: PCT/AU2008/000693
§ 371 (c)(1),
(2), (4) Date: Dec. 29, 2010

(87) PCT Pub. No.: WO2008/141369
PCT Pub. Date: Nov. 27, 2008

(65) Prior Publication Data
US 2011/0259757 A1    Oct. 27, 2011

(30) Foreign Application Priority Data

May 18, 2007 (AU) ................................ 2007902688

(51) Int. Cl.
*C25B 1/02* (2006.01)
*C25C 1/02* (2006.01)
(52) U.S. Cl. ......... 205/637; 205/334; 205/628; 205/633
(58) Field of Classification Search ........................ None
See application file for complete search history.

(56) References Cited

U.S. PATENT DOCUMENTS

| 2004/0238349 A1 | 12/2004 | Greathouse et al. |
| 2006/0233699 A1* | 10/2006 | Mills .......................... 423/648.1 |
| 2007/0284244 A1* | 12/2007 | Davidson ...................... 204/274 |

FOREIGN PATENT DOCUMENTS

WO    WO 2007/012149 A1    2/2007

OTHER PUBLICATIONS

International Preliminary Report on Patentability with Written Opinion for PCT Application No. PCT/AU2008/000693 issued Nov. 17, 2010.
Cirillo et al., "Transmutation of metal at low energy in a confined plasma in water," Eleventh International Conference on Condensed Matter Nuclear Science, 2004, Marseille, France.
Mizuno et al. "Confirmation of anomalous hydrogen generation by plasma electrolysis," $4^{th}$ Meeting of Japan CF Research Society, 2003, Iwate, Japan.
International Search Report for PCT International Application No. PCT/AU2008/000693, mailed Jul. 4, 2008.

* cited by examiner

*Primary Examiner* — Nicholas A Smith
*Assistant Examiner* — Ho-Sung Chung
(74) *Attorney, Agent, or Firm* — RatnerPrestia (57) ABSTRACT

This invention relates to a process and an apparatus for generating hydrogen and oxygen gas by electrolysis of water. The process involves forming an electrolyte including alkaline ions and the water and generating plasma between electrodes immersed in the electrolyte by applying an electrical potential between the electrodes. The plasma ionizes the electrolyte, thereby generating hydrogen and oxygen gas. The process further involves controlling the process by relocating the generated plasma between two or more further electrodes.

14 Claims, 4 Drawing Sheets

METHOD AND APPARATUS FOR PRODUCING HYDROGEN AND OXYGEN GAS

This application is a U.S. National Phase Application of PCT International Application No. PCT/AU2008/000693, filed May 16, 2008.

FIELD OF THE INVENTION

The present invention relates to electrolysis of water for producing hydrogen and oxygen gas.

BACKGROUND OF THE INVENTION

Electrolysis technology is increasingly being adopted as a method of generating hydrogen and oxygen where there is a demand for hydrogen/oxygen fuel for combustion or hydrogen fuel cells. One driving force behind this trend is a shift away from fossil fuels as an energy source.

The main types of electrolysis involve alkaline solutions and proton-exchange membranes. While both are proven technologies, they have limited conversion efficiency (i.e. the energy produced versus the energy input to drive the process) of less than 90%. Additionally, there is an initial high capital cost so applications generally are limited to specialist purposes.

A technical paper by Mizuno et. al., entitled "Confirmation of anomalous hydrogen generation by plasma electrolysis" in $4^{th}$ Meeting of Japan CF Research Society 2003, Iwate, Japan: Iwate University, discusses hydrogen generation in quantities greater than Faraday's Law predicts.

Specifically, Mizuno teaches that plasma forms when an applied potential difference between electrodes exceeds 100V in an aqueous solution and that a mixture of oxygen, hydrogen and steam are formed on the surface of a cathode.

However, Mizuno states:

"The generation of hydrogen at levels exceeding Faraday's law is observed when the conditions such as the temperature, current density, input voltage and electrode surface are suitable. The precise conditions are still not known, and controlling these conditions is difficult, so only a few observation of excess hydrogen have been made."

Mizuno observes non-Faradic hydrogen generation, for example, when plasma electrolysis occurred at 2 A/cm$^2$ of input current at 120V and at an electrolyte temperature of 80° C. Mizuno finally concludes that non-Faradic hydrogen generation occurs when the potential difference between electrodes is several hundred volts, but does not provide any explanation for controlling the plasma beyond short bursts.

A theory explaining plasma electrolysis that produces non-Faradic quantities of hydrogen is outlined in a technical paper by Cirillo et. al., entitled "Transmutation of metal at low energy in a confined plasma in water", in Eleventh International Nuclear Conference on Condensed Matter Nuclear Science, 2004, Marseille, France.

Specifically, Cirillo teaches that electrolysis is aided by metal anions, dissolved in an electrolyte, which form a screen spaced a few nanometers from the cathode, thereby effectively forming an anode. This is known as a double layer.

Under conventional electrolysis conditions, hydrogen gas is generated at the cathode with much of the space between the cathode and the anion screen being filled with $H_3O^+$ and $H_2$. Ions of hydrogen migrate through the screen to discharge on the cathode and produce hydrogen gas.

Increasing the applied voltage above 80V has the effect of significantly increasing hydrogen gas production to the point that the space between the cathode and the anion screen becomes filled with hydrogen gas. The gas has a much lower conductivity than liquid electrolyte, so the resistance increases until unstable bursts of plasma form to discharge the potential difference between the cathode and the anion screen. The high localised voltage can result in cathode temperatures, for tungsten electrodes, greater than 3000° C. Such heating of the cathode results in instant vaporization of electrolyte from the surface of the cathode and destabilizes plasma formation.

Cirillo does not discuss hydrogen generation as a goal and does not address problems of stabilizing plasma.

SUMMARY OF THE INVENTION

The object of the invention is to provide an improved apparatus and method for stabilizing plasma for the purpose of generating hydrogen and oxygen gas.

The invention provides a process for producing hydrogen gas and oxygen gas, from water, the process comprising:
(a) forming an electrolyte including alkaline ions and the water;
(b) generating plasma between an anode and a cathode immersed in the electrolyte by applying a first electrical potential between the anode and cathode, thereby plasma electrolysing the electrolyte and generating hydrogen and oxygen gas; and
(c) controlling the process by relocating the generated plasma between two or more further electrodes and the anode.

The applicant believes that overheating of the plasma generating electrode can be avoided by spatially distributing the plasma around the electrolysis cell. Specifically, the applicant believes that in Cirillo and Mizuno, localisation of the plasma bursts at the plasma electrodes caused such intense heating of the electrodes that the screen layer of alkaline ions adjacent the cathode is disrupted by the hot cathode vaporising nearby electrolyte. As a result, plasma generating conditions are lost and the electrolysis process no longer operates on the basis of plasma electrolysis until the plasma generating electrodes cool sufficiently to form a screen layer of alkaline ions.

The applicant believes that plasma generated at the electrodes can be stabilised, rather than occurring in short bursts, by controlling the location of the plasma with electrical and magnetic fields. As a result, the structure of the alkaline ion screen surrounding the cathode is maintained with largely hydrogen gas filling the gap between the cathode and the alkaline ion screen. Hydrogen ions continue to migrate through the metal anion screen to form hydrogen gas and plasma is constantly initiated at the cathode for stabilisation on the further electrodes. Ions of OH$^-$ migrate to the anode and form oxygen gas.

The relocated plasma is maintained between the further electrodes without an alkaline ion screen layer and, therefore, without a gaseous or vapour dielectric surrounding the electrodes. Nevertheless, the electrolyte treated by plasma is ionised and the ions produce oxygen and hydrogen gas at respective electrodes.

The location of the plasma may be controlled by applying a second electrical potential between each further electrode and the anode.

The location of the plasma may also be controlled by magnetic fields and, preferably, the magnetic fields are produced by permanent magnets.

Preferably, the electrolyte comprises water with a concentration of alkaline ions in the range of 0.1-1.0 M.

Preferably the alkaline ions are metal anions and may comprise sodium or potassium. The electrolyte may be formed by mixing water with a hydroxide, chloride or carbonate forms of the metal anions.

Preferably the cathode comprises the cell body in contact with the electrolyte and the anode comprises a metal and is electrically isolated from the cathode.

By forming the cathode as a body of an electrolysis cell, the plasma generated between the cathode and anode is encouraged to spatially disperse away from the points of closest geometrical proximity between the anode and the cathode, thereby assisting to spatially distribute the plasma around the electrolysis cell.

Preferably, the first electrical potential is at least 160 volts, but more preferably, is 180 to 400 volts.

Preferably, the two or more further electrodes are located in close proximity to the cathode so the second electrical potential applied to the two or more further electrodes encourages plasma generated between the cathode and the anode to transfer to between the further electrodes and the anode.

Preferably the second electrical potential is 40 to 200 volts and, more preferably, is 55 to 100 volts.

Preferably, the process includes a further step before step (b) of heating the electrolyte by passing a current in the range 40 to 120 A, and more preferably 65 to 85 A, between two further electrodes electrically isolated from the anode and immersed within the solution.

Preferably, the heating step heats the electrolyte to a temperature of 50 to 100° C. and more preferably to a temperature of 80 to 95° C.

Preferably the first electrical potential is applied after the electrolyte is heated in accordance with the heating step.

Preferably, step (c) involves applying a second electrical potential to two or more further electrodes in contact with the electrolyte and in close proximity to the first electrodes, the second electrical potential generating an electrical field to cause plasma generated between the cathode and the anode to transfer from the cathode to two or further electrodes to stabilise the plasma.

The present invention also provides an apparatus for producing oxygen and hydrogen gas from water comprising:
(a) a cell defining a volume for containing an electrolyte, the cell comprising an electrically conductive material;
(b) electrolyte input means for supplying the electrolyte to the volume;
(c) gas collection means for conveying oxygen and hydrogen gas away from the cell;
(d) one or more cathodes positioned within the cell for immersion within electrolyte contained within the cell and for generating plasma;
(e) two or more further electrodes positioned within the cell for immersion within the electrolyte and for generating electrical field within the cell to relocate plasma generated at the or each cathode away from the or each cathode, each further electrode being electrically isolated from the cathode.

Preferably, the two or more further electrodes define a planar surface area for spatially distributing plasma between the surface area and the cell.

Preferably, the two or more further electrodes include an array of apertures for increasing the surface area of the electrode to enhance spatial distribution of plasma.

Preferably, the cell comprises an anode for forming plasma in conjunction with the cathode, the cathode being electrically isolated from the cell.

Preferably, the apparatus includes an electrolyte flow member for reducing the effect of turbulence caused by gas bubbles moving around the further electrodes.

Preferably, the electrolyte flow member defines a first channel within the cell for enabling gas bubbles to rise through electrolyte when contained within the cell and a second channel that enables relatively quiescent electrolyte to flow into the first channel, thereby assisting to displace gas bubbles from the further electrodes.

Preferably, the electrolyte flow member is formed as a sleeve for location within the cell volume between the further electrodes and adjacent cell wall, the sleeve is open at each end and defines a volume between the ends that comprises the first channel and defines the second channel between the sleeve and the adjacent cell wall such that electrolyte is able to flow from the second channel around an end of the sleeve and into the first channel.

Preferably, the sleeve is formed from electrically conductive material and, in situ within the cell, is electrically connected to the cell.

BRIEF DESCRIPTION OF THE DRAWINGS

A preferred embodiment of the invention will now be described, by way of example only, with reference to the accompanying drawings, in which.

DETAILED DESCRIPTION OF A PREFERRED EMBODIMENT

Figure 1:
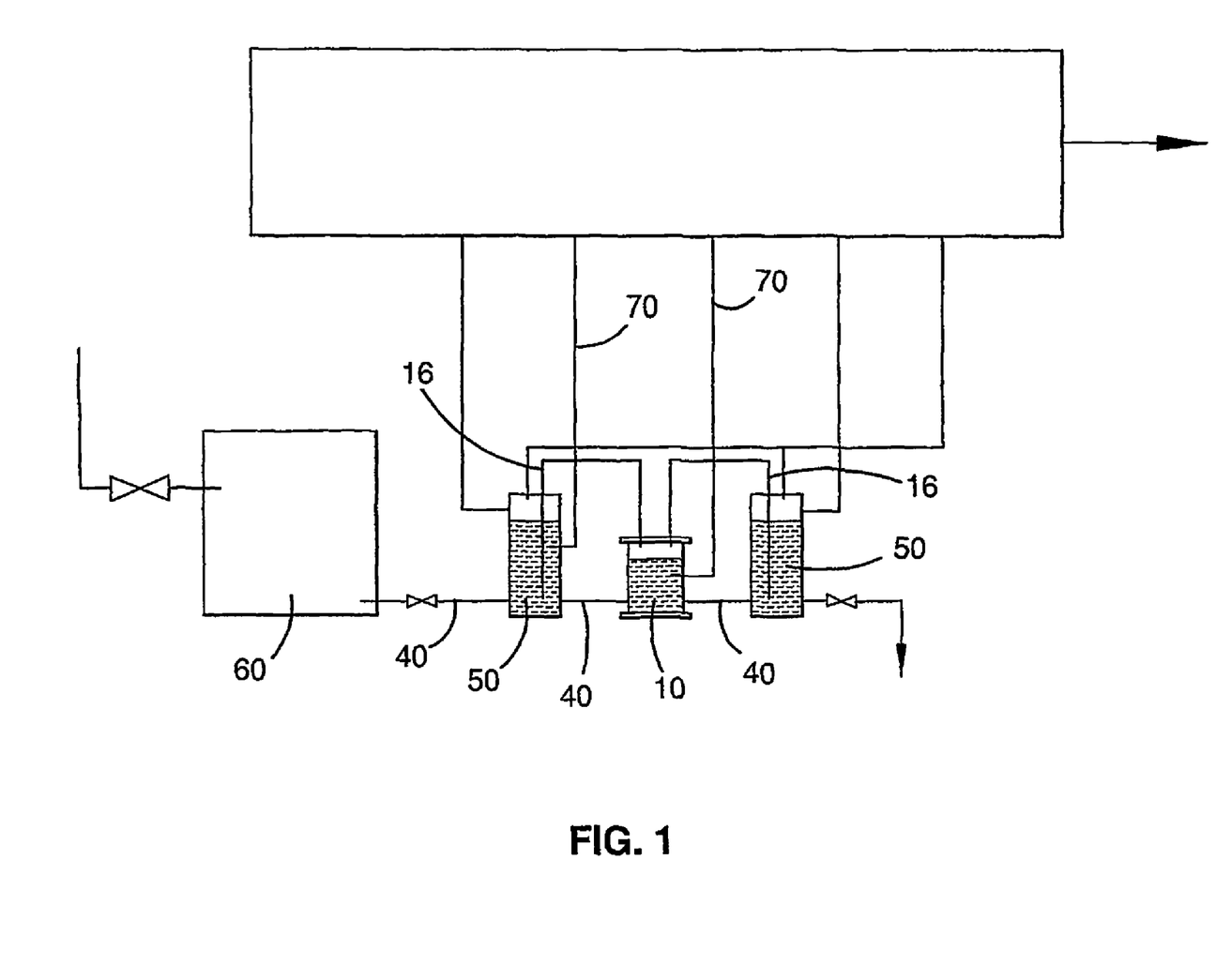
FIG. 1 is a schematic diagram of an apparatus in accordance with an embodiment of the invention.

An electrolysis process in accordance with the present invention may be performed with the apparatus illustrated in FIG. 1.

The apparatus comprises an electrolysis cell 10 linked to gas separators 50 by electrolyte conduits 40 and off-gas lines 16. The separators 50 are linked to an electrolyte reservoir 60 by a further electrolyte conduit 40 to ensure that the separators remain filled with electrolyte. Thermocouples 70 are located respectively in the cell 10 and in a separator 50 to monitor the temperature of the electrolyte. Although not shown in FIG. 1, two separate power sources provide electrical energy for the electrolysis process.

Figure 2:
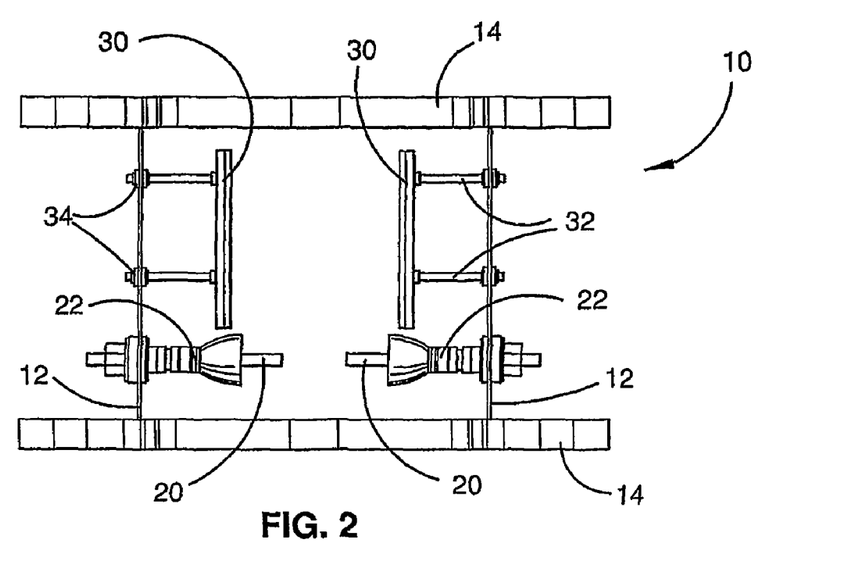
FIG. 2 is a side view of an electrolysis cell with the side wall removed and which is suitable for use in the apparatus illustrated in FIG. 1.

The cell 10 (as shown in FIG. 2) comprises a hollow cylindrical body 12 with outwardly extending flanges 14 at each end of the body 12. The flanges 14 enable covers (not shown) to be fastened to each end of the body 12 with intermediate gaskets to form a closed volume within the cylindrical body 12 that is air-tight and water-tight.

The cell 10 further includes two cathodes 20 and isolators 22 disposed on diametrically opposed sides of the cylindrical body 12. The cathodes 20 comprise tungsten rods with a diameter of 3.2 to 4 millimeters and 45 millimeters long. The cathodes 20 are held within electrical isolators 22 formed of ceramic material in a bell shape extending from a fixed end of cathode 20. The isolators 22 include an electrically conducting core that connects the cathode 20 to a power source and which extends through the cylindrical body 20.

The cell body 12 has an internal diameter of 155 millimeters and each cathode 20 extends from a side wall of the cylindrical body 12 into the cell 10 by a distance of approximately 70 millimeters such that the respective ends of the opposed cathodes 20 are approximately 15 millimeters apart.

Two electrolysis electrodes 30 are located within the cell 10 disposed vertically above each respective cathode 20 such that a center line drawn through the cathode 20 and the lowermost edge of the electrolysis electrodes 30 are spaced apart by a distance of 20 millimeters.

The electrolysis electrodes 30 are spaced from the cylindrical body 12 by a distance of 25 millimeters at the point where the screws 22 contact the electrolysis electrodes 30. The upper most edge of the electrolysis electrodes 30 is spaced from the top panel of the cell 10, when located on the cell 10, by a distance of 45 millimeters. Furthermore, a spacing of 50 millimeters separates a center line drawn through the cathodes 20 and a bottom cover (not shown) attached to the flanges 14 to form the bottom of the cell 10.

The electrolysis electrodes are formed of perforated steel to include an array of apertures for increasing the effective surface area of the electrolysis electrodes 30.

The electrolysis electrodes are fixed to the side wall of the cell body 12 by screws 32 which are electrically isolated from the cell 10 by insulating mounts 34 that comprise respective silicone gaskets and O-rings.

A top cover (not shown) of the cell 10 includes two apertures to which off-gas conduit lines 16 are connected for removing oxygen and hydrogen water vapour from the cell. The off-gas conduit lines 16 extend respectively into the separators 50 so that the cell off-gas bubbles through the electrolyte contained within the separators 50.

The electrolysis process involves forming an electrolyte by preparing an aqueous alkaline solution from water. The solution comprises water mixed with 0.1-1.0 M KOH (potassium hydroxide). However, other alkaline metal ions may be provided by suitable forms of sodium.

The cell 10 is filled with electrolyte, initially, conventional electrolysis is performed by applying an electrical potential between the electrolysis electrodes 30. The electrical potential is applied by a typical power supply with a MOSFET transistor control such that an electrical potential of 59 to 100V DC and a current of 40 to 200 A is applied. Preferably, the current is 50 to 85 A. This electrolysis causes the solution to heat up from ambient temperature.

Although hydrogen and oxygen gas can be extracted from the solution with plasma electrolysis at solution temperatures between 50 to 100° C., the solution preferably is heated to a temperature in the range 80 to 95° C. The temperature of the electrolyte is monitored via thermocouples 70 in the cell 10 and in one of the separators 50.

Once the desired solution temperature is attained, the electrical potential applied to the electrolysis electrodes 30 is switched off and a DC electrical potential is applied to the plasma electrodes 20.

The electrical potential is applied between the plasma electrodes 20 and the cell body 12. An electrical potential in the range 160 to 240V may be applied, but an electrical potential in the range 180 to 200V is suitable to initiate plasma formation. The application of an electrical potential to the plasma electrodes 20 and the cell body 12 continues conventional electrolysis and increases the amount of hydrogen and oxygen gas generated. Hydrogen ions are formed and migrate to the plasma electrodes 20, and OH− ions migrate to the cell body 12. This ionic flux allows current to pass through the electrolyte and produces hydrogen at the plasma electrodes 20 and oxygen at the cell body 12. The oxygen is produced through the ionic OH− discharge at the cell body 12, and the hydrogen gas is mainly produced through the direct discharge of the water molecule at the cathode, according to the following reactions:

Cathode: $2H_2O+2e^-=H_2+2OH^-$ or $2H_3O^+ +2e^-\longrightarrow H_2 2H_2O$ (Equation 1)

Anode: $4OH^-=2H_2O+4e^- +O_2$ (Equation 2)

The overall cathode reaction (Equation 1) is strongly enhanced by the metal anions, in this case potassium ions ($K^+$), that are dissolved in the solution. The potassium ions have greater oxidation potential than hydrogen. Accordingly, the cathode reaction (Equation 1) will last until all the hydrogen disappears from the solution. Simultaneously, the potassium ions will collect around the cathode, without depositing on it, to form a sleeve or screen with a positive potential that holds itself few nanometers from the surface of the plasma electrodes 20. In this situation, the space between the screen of potassium ions and the plasma electrode 20 becomes filled with $H_3O^+$ and $H_2$ which acts as a dielectric. In spite of this screen of potassium ions, ions of hydrogen, being much smaller, will continue to work through the screen of potassium ions without difficulty to deposit on the plasma electrodes 20 and generate gaseous hydrogen.

As electrolysis proceeds, the amount of the hydrogen generation increases significantly, so much that it blocks further hydrogen ions from reaching the plasma electrodes 20. As a result, there is a dielectric breakdown between the plasma electrodes 20 and the potassium ion screen due to a sufficiently high resistance in the gaseous space separating the plasma electrodes 20 and the potassium ion screen that causes plasma formation. The plasma causes the potential to drop locally as the electrical current in the plasma bridges the space between the plasma electrodes 20 and the potassium ion screen. Accordingly, the plasma is unstable. The plasma, however, is stabilised to a small extent by increasing the voltage to approximately 240V.

Additionally, the cathode isolators 22 improve plasma stability by regulating the extent to which the plasma electrodes 20 are exposed to the flux of electrons and to the geometry of the plasma electrodes 20.

The plasma electrodes 20 become heated to a temperature at which water in the electrolyte close to the plasma electrodes 20 evaporates instantaneously, generating a vapour-sleeve dielectric field around the plasma electrodes 20. As a result, the electrical conduction mechanism in the cell 10 changes because the region covered by plasma is much less involved in electrical conduction through the cell 10, thus causing electrolysis conduction to increase and hydrogen formation to reduce. Accordingly, the current through the electrolyte, in the form of plasma, significantly falls and stabilizes.

In Mizuno, this is the instability that results in plasma generation breaking down. The applicant has discovered that plasma can be maintained by applying an electrical field to move generated plasma away from the plasma electrodes 20, thereby controlling the temperature of the plasma electrodes 20 to a temperature at which plasma is being generated and controlling the spatial distribution of plasma in the solution. The latter aspect contributes to an overall increase in hydrogen and oxygen gas generation.

The plasma is stabilised by applying an electrical field that attracts plasma away from the plasma electrodes 20. The electrical field is applied by applying an electrical potential to the electrolysis electrodes 30, e.g. 12 to 100V and a current of 75 A. Although the potential is applied between the electrolysis electrodes, a larger potential is created between each electrolysis electrode 30 and the cell body 12. As a result, plasma, which tends to reach the physical surface of the solution, is strongly attracted to nearby charges allowing a new plasma path to be formed. The new path relocates and scatters the plasma from between the plasma electrodes 20 and the cell body 12 to between the electrolysis electrodes 30 and the cell body 12. The plasma is spatially distributed through a greater volume of the cell 10, thereby forming a bigger electrolysis effect and avoiding formation of a gaseous vapour dielectric on the electrolysis electrodes 30.

By relocating the plasma, melting of the plasma electrodes 20 is avoided, thus preserving the plasma electrodes 20 for a longer working life.

Control of plasma and output of generated gases is achieved through varying the current applied to the electrolysis electrodes 30.

Figure 3:
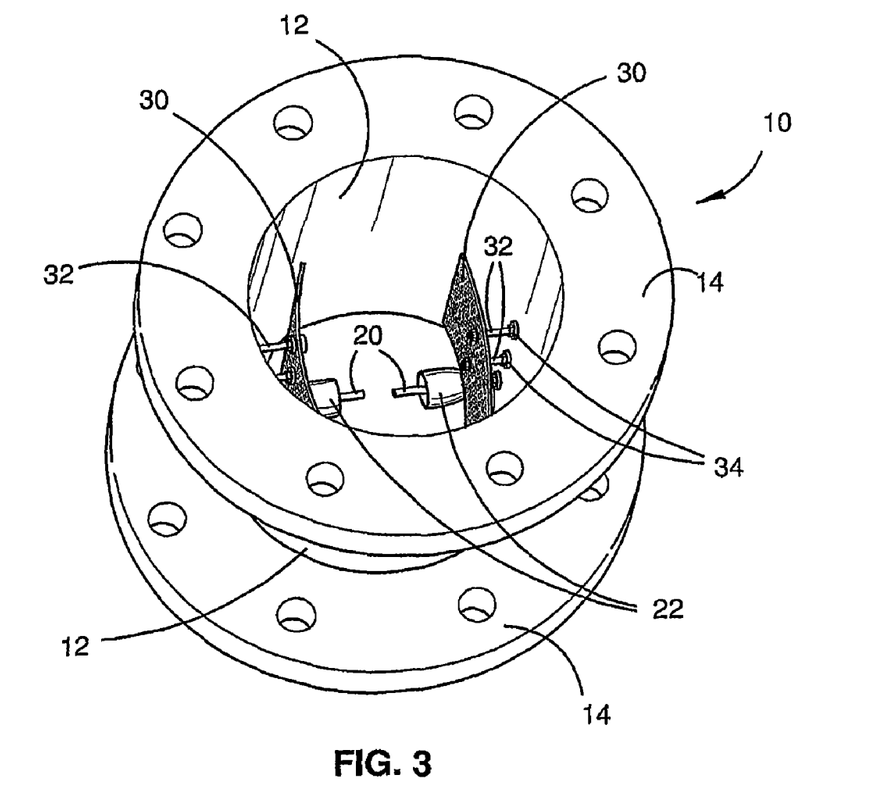
FIG. 3 is a top perspective view into a cell constructed in accordance with the cell in FIG. 2.

As plasma is shifted from the plasma electrodes 20 to electrolysis electrodes 30, slight etching of the surface of the cell body 12 adjacent one electrolysis electrode 30 is observed (as shown on the right-hand side of the cell body 12 in FIG. 3) and burning marks appear on the surface of the cell body 12 adjacent the other electrolysis electrode 30 (as shown on the left-hand side of the cell body 12 in FIG. 3) which becomes etched. The burning and etching indicate that the electrolysis electrodes 30 are reaching temperatures at which thermionic emissions occur.

Temperature fluctuations in the cell 10 are stabilized by managing the volume of surrounding electrolyte via direct connection of the cell 10 to the separators 50 with a higher level of solution. This volume of solution also assists to maintain a stable cell 10 temperature by circulating solution through the cell 10 and separators 50.

Associated equipment is electrically isolated from the cell 10 and the ground connection is protected by a metal enclosure in which the apparatus is installed.

Hydrogen and oxygen created by the electrolysis process is captured in the form of a gas mixture. Although the hydrogen and oxygen may be separated from the mixture to be used separately, the mixture itself may be used as a source of clean energy by combusting the mixture.

An alternative embodiment of a plasma electrolysis cell 100, for use with the apparatus described above, is shown in FIGS. 4 and 5.

Figure 4:
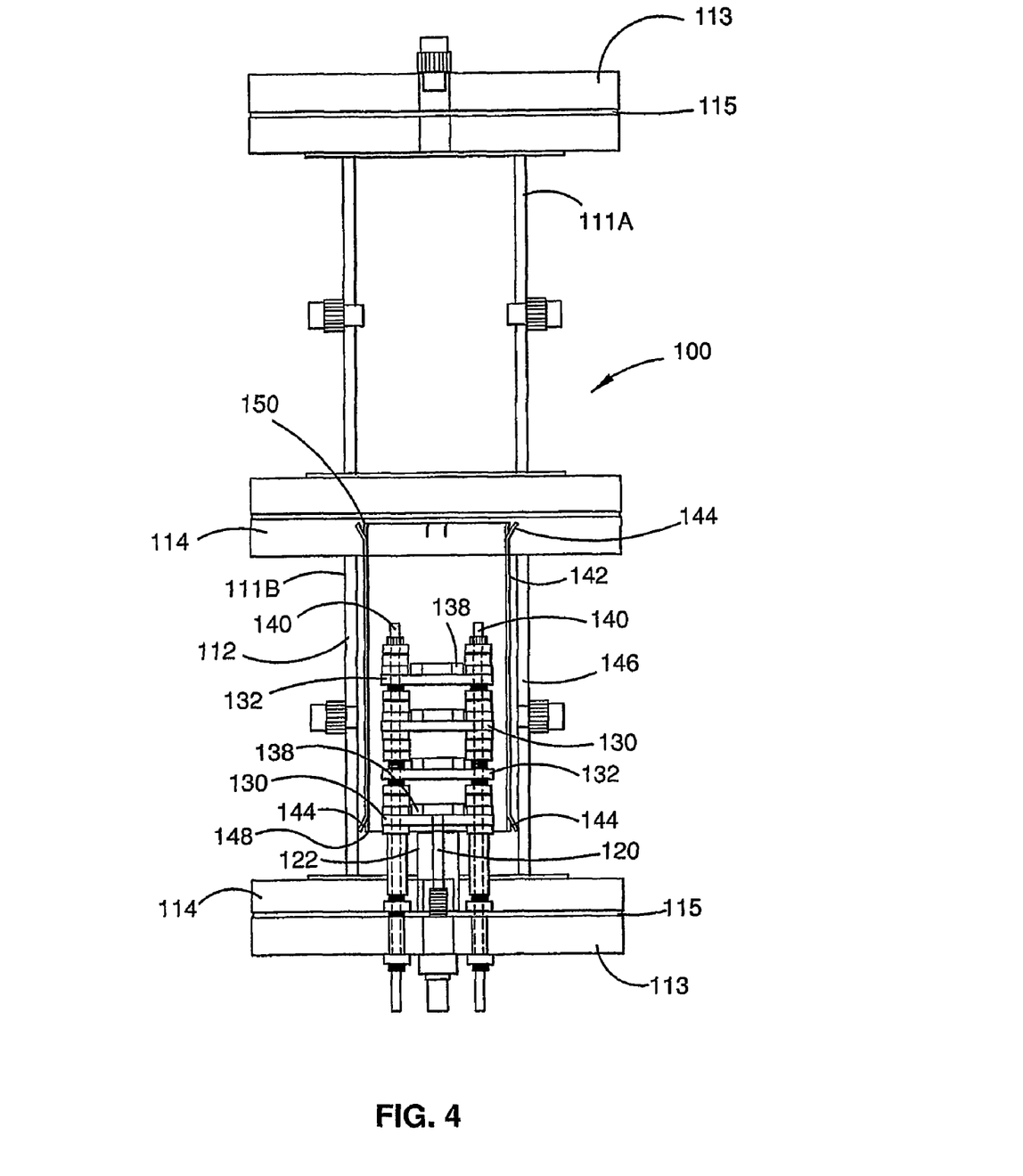
FIG. 4 is a schematic isometric view of an alternative embodiment of a plasma electrolysis cell for use with the apparatus of FIG. 1.

The cell 100 comprises two stacked upper and lower parts 111A and 111B. Each part 111A and 111B has a cylindrical body 112 with outwardly extending end flanges 114 at each end of the body 112. The parts 111A and 111B are formed of low carbon marine grade, austenitic stainless steel 316L with an outer diameter of 125 millimeters and an inner diameter of 95 millimeters. The stainless steel has anti-corrosion properties through passivation phenomena and physical protection from thermal emissions, magnetic emissions, magnetron frequency waves and low radiation emissions.

The austenitic stainless steel reduces metallic contamination during high temperature ionic emissions and does not react readily with hydrogen and, additionally, is not magnetic.

The stacked parts 111A and 111B are fastened together to form a substantially continuous cylindrical volume within the cylindrical bodies 112. Respective ends of the parts 111A and 111B are closed by covers 113 such that the volume is fluidtight. To form an appropriate seal, a disc 115 of Tetron S®-Virgin Teflon®, having the same diameter as the flanges 114, is disposed between the covers 113 and the flanges 114. Accordingly, the bottom cover 113 is electrically isolated from the remainder of the electrolysis cell 100. Additionally, Teflon® washers isolate bolts that fasten the top and bottom covers 113 to the respective bodies 112.

As with the embodiment described above, the cell 100 is formed of electrically conductive material to form an electrode. A plasma electrode 120 extends into the cylindrical volume defined by the cylindrical body 112 through the cover 113. The plasma electrode 120 is electrically isolated from the cover 113 by an isolator 122 to prevent short circuiting between the cell 100 and the plasma electrode 120.

Electrolysis electrodes for performing initial electrolysis to heat an alkaline solution are provided in the form of electrolysis cathodes 130 and electrolysis anodes 132 supported on rods 140 and formed of 316L stainless steel. Although two cathodes 130 and two anodes 132 are shown in FIG. 4, it will be appreciated that one or more cathodes 130 and one or more anodes 132 may be alternately supported along the two generally parallel support rods 140.

The support rods 140 are electrically conductive and the cathodes 130 are electrically connected to one of the support rods 140, but electrically isolated from the other support rod 140. Similarly, the anodes 132 are electrically connected to the other support rod 140, but electrically isolated from the support rod 140 to which the cathodes 130 are electrically connected.

Through the bottom cover 113, two rods 141, formed of stainless steel 316, protrude and extend into the electrolysis cell 100 for supporting the support rods 140. The rods 141 are isolated from the cover 113 and body 112 by ceramic sheathes 153 which are fitted with o-rings 151 comprising the material Nitrile 70 Duro. Additionally, the rods 141 are electrically isolated from the cover 113 by heat shrink insulation 152 and any remaining gaps are filled with high temperature resistive silicon based filler.

The cathodes 130 and anodes 132 are generally discshaped to fill a substantial cross-sectional area of the cylindrical body 112. However, the anode 130 in closest proximity to plasma electrode 120 is formed with hole, approximately 4 millimeters in diameter, adjacent to the plasma cathode 120.

The cathodes 130 and anodes 132 are formed from martensitic stainless steel STAVAX® with good magnetic properties and a permanent magnet 138 having the shape of an annulus is positioned in the centre of each anode 130 and cathode 132. Spacing between the cathodes 130 and anodes 132 is provided by ceramic spacers and is more than double the distance between each electrode and the body 112.

This configuration of plasma electrode 120, electrolysis cathodes 130 and electrolysis anodes 132 and permanent magnets 138 ensures that the electrical field generated by the electrolysis cathodes 130 and the electrolysis anodes 132 and the magnetic field generated by the permanent magnets 138 causes relocation of plasma from the plasma electrode 120 to the electrolysis electrodes 130, 132.

The plasma electrode 120 is positioned in the centre of the cover 113 and is formed as a rod with a diameter of 3 to 4 mm. The rod comprises a core of tungsten thoriated 2% and a copper sleeve spaced a small distance from the core such that electrolyte fills the space. The copper sleeve is shorter than the core such 0.2 to 3 mm of the tungsten core extends beyond the end of the copper core. The plasma electrode 120 is electrically isolated from the cover 113 by the insulator 122 that extends through the cover 113. The insulator 122 is approximately 5 mm shorter than the plasma electrode 120 and is spaced at least 5 mm from the plasma electrode along its length. A distal end of the core is located in close proximity to the first electrolysis cathode 130.

The cell 100 includes a conductive sleeve 142 formed of martensitic stainless steel and that is positioned in a lower part 111B between the electrolysis anodes and cathodes 130 and 132 and the cell body 112. The sleeve 142 (in FIG. 5) has a hollow cylindrical form and, at each end, four tabs 144 that project outwardly from the sleeve 142. The tabs 144 are located at 90 degree intervals around the rim of the sleeve 142 and diverge outwardly from the sleeve 142 such that the distance between free ends of opposed tabs 144 is slightly greater than the inner diameter of the cell body 112.

Figure 5:
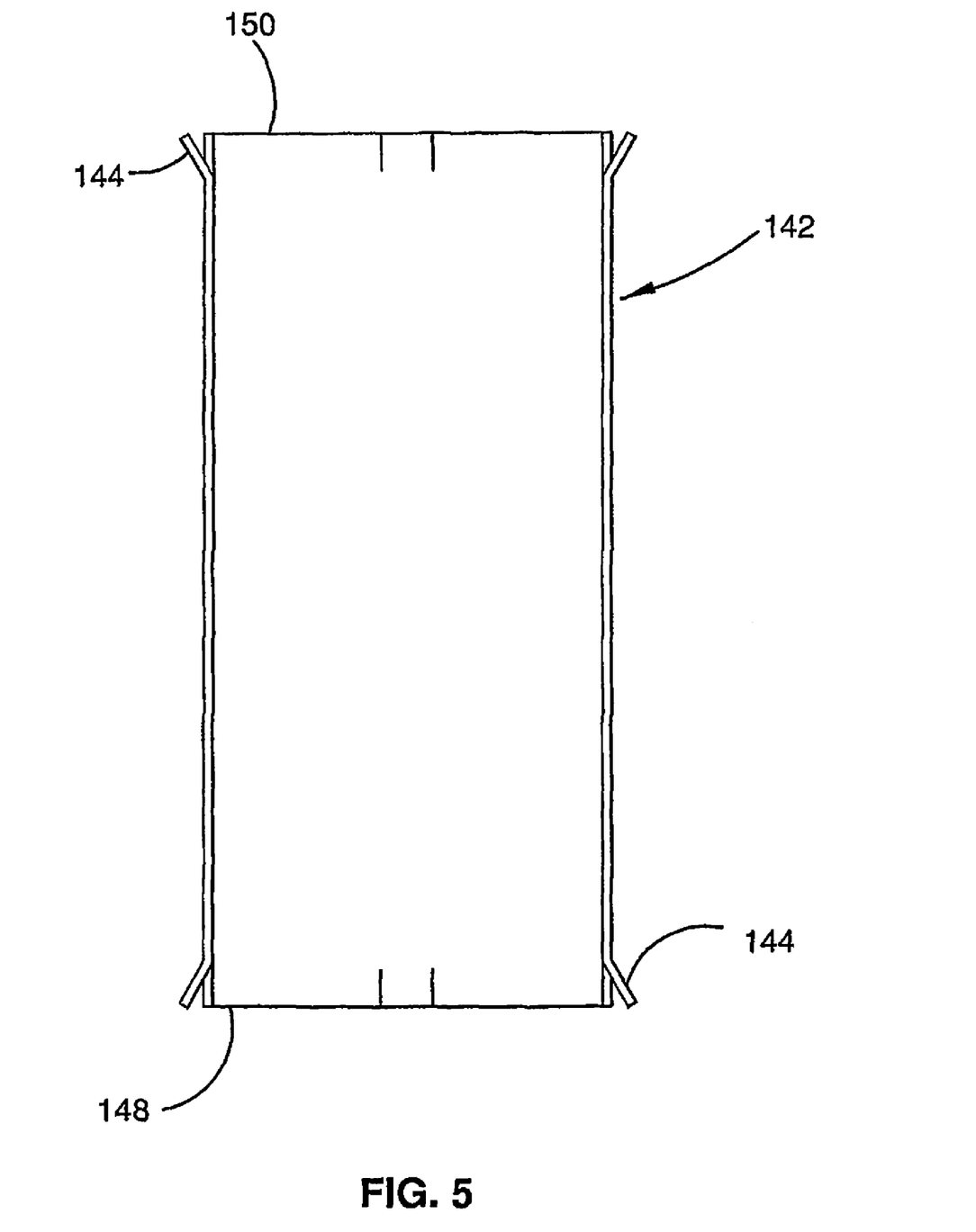
FIG. 5 is a schematic isometric view of an electrode sleeve for the plasma electrolysis cell of FIG. 4.

The sleeve 142 is formed of stainless steel so that the tabs 144 are resiliently deformable inwardly toward the rim of the sleeve 142 to enable the sleeve 142 to be inserted into the cell body 112.

The cell body 112 includes "push-in" type stainless steel connectors 156 that enable electrolyte to enter the cell body 112 for maintaining the level of electrolyte within the cell and for enabling generated hydrogen oxygen gas to exit the cell body via plastics tubing comprising PTFE. The tubing leads to separators as discussed above.

A K-type thermocouple is used to measure temperature and is located within the cell body 112 between the cell body 112 and the conductive sleeve 142 where the thermocouple is protected from direct energetic emissions of plasma.

Optionally, the top cover 113 includes a magnetron that is housed in a metal enclosure to prevent escape of magnetron wave radiation and that is electrically connected to a high voltage electrical source. The metal enclosure also contains holes for air cooling of the magnetron.

The electrolysis cell 100, separators and electrical supply equipment are enclosed in a further metal housing for protection from electrical and magnetron emissions. The electrolysis cell 100 and the remainder of the system is built to withstand extreme pressures and to be air and water tight.

In order to generate hydrogen and oxygen gas, electrolyte is supplied to the cylindrical volume defined by the parts 111A and 111B to a level above the top rim 150 of the sleeve 142 and generally to a level approximately half way up the part 111A. Filling the cell 100 to such level ensures that sufficient electrolyte is maintained in the region of the electrolysis cathodes and anodes 130 and 132 despite upwelling of electrolyte caused by rising gas bubbles.

The electrolyte may be the same electrolyte used for the cell 10 described above, i.e. water with potassium ions.

Gas is produced by initially heating the electrolyte by carrying out electrolysis with the electrolysis cathodes 120 and anodes 132. Gas produced in this manner is not exhausted from the cell 100 in order to build up a back pressure such that subsequent bleeding and burning of gas produced in the cell 100 prevents flames from tracking back into cell 100.

When the temperature of the electrolyte reaches 90 to 95° C., a potential difference of approximately 180 volts from a DC source is applied between the plasma electrode 120 and the cell body 112. The plasma electrode 120 is connected to the positive side of the power source and the cell body 112 is connected to the negative side of the power source.

Accordingly, the tungsten thoriated core and the copper sleeve become positively charged and develop a multiple layer arrangement with hydrogen ions forming respective layers close to the surface of each of the tungsten core and the copper sleeve. Between the hydrogen ions, a layer of potassium ions forms. The formation of the multiple layers increases resistivity in the electrolyte with the result that ions are unable to discharge on the tungsten thoriated core or the copper sleeve in the region between each. The result is that plasma discharges form and migrates toward the end of the tungsten thoriated core adjacent a lowermost electrolysis cathode 130.

As the ions between the core and the sleeve are unable to readily discharge, only a small amount of gas is produced and the multiple layers of ions are generally unaffected by rising bubbles of gas. Accordingly, continual generation of plasma prevents overheating of the tungsten thoriated core, which in turn prevents vaporisation of electrolyte from around the tungsten thoriated core and, therefore, makes the multiple layer arrangement of ions relatively stable.

In contrast, the exterior of the sleeve is subject to significant gas production by ions discharging on the copper sleeve and also due to having a surface area greater than the core and the inner surface of the sleeve. Gas bubbles rise through the electrolyte toward the electrolysis cathode 130. The bubbles disperse outwardly across the surface of the electrolysis cathode 130 or may pass through a hole formed in the electrolysis cathode 130 adjacent to the tip of the tungsten thoriated core.

Plasma extending from the plasma electrode 120 results in significant quantities of charge being applied to the lowermost electrolysis cathode 130 and to the electrically linked alternate electrolysis cathode 130. The high charge results in the formation double layer which facilitates disbursement of the formed plasma to the perimeter of the lowermost electrolysis cathode 130.

Electrical fields formed by applying a potential difference between the electrolysis cathodes 130 and electrolysis anodes 132 facilitate relocation of the plasma from the lowermost electrolysis cathode 130 to the remaining electrolysis cathode 130 and electrolysis anodes 132. Furthermore, as plasma comprises moving electrons which have a magnetic field, permanent magnets 138 located on top of each electrolysis cathode and electrolysis anode 130 and 132 establish magnetic fields within the cell 100 which facilitate relocation of the plasma from the lowermost electrolysis cathode 130 to the other electrolysis cathode 130 and the electrolysis anodes 132. Additionally, inner sleeve 142 becomes magnetized and forms part of the magnetic flux provided by the permanent magnets 138 and, therefore, forms a path for plasma discharge between electrolysis cathodes 130 and electrolysis anodes 132 and the sleeve 142.

The cell body is at a lower potential than the potential of the respective electrolysis cathodes 130 and electrolysis anodes 132. Accordingly, the plasma extends from the electrolysis cathodes 130 and electrolysis anodes 132 to the sleeve 142 that is electrically linked to the cell body 112. Through visual inspection, the applicant has determined that the plasma initiated at the plasma electrode 120 substantially fills the volume defined within the sleeve 142. Plasma electrolysis of the electrolyte results in breaking of bonds between hydrogen and oxygen atoms in water so as to produce hydrogen and oxygen gas for use in other applications.

By controlling the current applied to the electrolysis cathodes 130 and electrolysis anodes 132, it is possible to control the amount of gas produced. Specifically, applying a relative high current results in a relatively small difference in current flow between the electrolysis cathodes 130 and electrolysis anodes 132 and the sleeve 142. This means that the current in the plasma is relatively small and gas generation is relatively low. However, applying a relatively small current to the electrolysis cathodes 130 and electrolysis anodes 132 results in the plasma having a relatively large current thereby producing greater quantities of gas. Accordingly, the power source linked to the electrolysis cathodes 130 and electrolysis anodes 132 that enables variation of current and, in this embodiment, that comprises a MOSFET power source.

Initially, the potential voltage applied between the plasma electrode 120 and the cell body 112 is 240 volts. However, after several seconds, once the multiple layers are formed, a condenser is connected to the power source linked to the plasma electrode 120 to increase the potential difference to approximately 375 volts. This potential difference is sufficient to attract plasma discharges onto the sleeve 142 from the electrolysis cathodes 130 and electrolysis anodes 132.

Optionally, the magnetron may be operated to enhance gas production. Specifically, operating the magnetron at 2.45 GHz places further stress on bonds between hydrogen and oxygen atoms with the result that, in combination with exposure to plasma, breaking of bonds is enhanced and gas production increases.

Hydrogen is bonded with oxygen in water not only as a single molecule bond but rather as clusters of molecules bonded together. The substantial cooperative strengthening of the hydrogen bond is dependent on long range interactions and strength of each bond in each cluster. It encourages building of larger clusters for the same average bond density. Every hydrogen bond formed increases the hydrogen bond status of two water molecules in the cluster and every hydrogen bond broken reduces the hydrogen bond status of two water molecules. Breaking one bond generally weakens those around, with further breaking of bonds weaker hydrogen bonding surface and restricts hydrogen bonding potential of adjacent water, so that these make fewer and weaker hydrogen bonds. Reorientation in one molecule induces corresponding motions in the closest molecules.

Microwave radiation interacts with the water dipole, moving the bond molecules backwards and forwards and so stretching and bending the hydrogen bonds. As a result, heat is generated and dielectric permittivity of water is substantially reduced. As temperature increases, the strength of hydrogen bond additionally decreases. Magnetron radiation is absorbed by the first layer of electrolyte it encounters on beginning and penetrate further into the electrolyte, resonating molecules, heating it more evenly. Unabsorbed radiation passes through and is reflected back from the cell body 112 and cover 113 due to design of the cell 100 and is absorbed by the electrolyte after reflection. Accordingly, there is a phase delay which resonates bonds of hydrogen in electrolyte even further. Employing combined electrolysis and magnetron frequency radiation results in excessive heat and in dielectric permittivity of electrolyte being reduced with the result that bonds break more easily, thereby releasing hydrogen/oxygen gases with lower electrolysis current.

During operation of the cell 100, the sleeve 142 acts as an electrode such that plasma extends between the sleeve 142 and the electrolysis cathodes and anodes 130 and 132. The sleeve 142 may be replaced as required in a relatively simple operation.

Significant quantities of hydrogen and oxygen gas are produced in the course of operating the cell. The hydrogen and oxygen gas manifests as gas bubbles that rise through the electrolyte from the electrolysis cathodes and anodes 130 and 132 and from the sleeve 142. The rising gas bubbles cause turbulence and may disrupt plasma stability unless sufficient electrolyte is maintained between the sleeve 142 and the electrolysis cathodes and anodes 130 and 132.

To reduce the effect of turbulence, the sleeve 142 aids circulation of electrolyte within the cell 100. Specifically, electrolyte rising through the volume defined by the sleeve 142, caused by gas bubble turbulence, is replaced by electrolyte moving downwardly in a channel 146 between the sleeve 142 and the cell body 112 and around the lower rim 148 of the sleeve 142 back upwardly through the sleeve 142 volume.

Reference to any prior art in the specification is not, and should not be taken as, an acknowledgment or any form of suggestion that this prior art forms part of the common general knowledge in Australia or any other country.

Many modifications may be made to the preferred embodiment of the present invention as described above without departing from the spirit and scope of the present invention.

It will be understood that the term "comprises" or its grammatical variants as used in this specification and claims is equivalent to the term "includes" and is not to be taken as excluding the presence of other features or elements.

The invention claimed is:

1. A process for producing hydrogen from water comprising:
   (a) forming an electrolyte including alkaline ions and the water;
   (b) generating plasma between an anode and a cathode immersed in the electrolyte by applying a first electrical potential between the anode and cathode, thereby generating hydrogen and oxygen gas; and
   (c) relocating the generated plasma between two or more further electrodes and the anode in order to control a location of the generated plasma.

2. A process according to claim 1, wherein the location of the plasma is controlled by applying a second electrical potential between each further electrode and the anode.

3. A process according to claim 2, wherein the two or more further electrodes are located in close proximity to the cathode so the second electrical potential applied to the two or more further electrodes encourages plasma generated between the cathode and the anode to transfer to between the further electrodes and the anode.

4. A process according to claim 2, wherein the first electrical potential is at least 160 volts and the second electrical potential is 40 to 200 volts.

5. A process according to claim 3, wherein the location of the plasma is controlled by magnetic fields.

6. A process according to claim 5, wherein the magnetic fields are produced by permanent magnets.

7. A process according to claim 6, wherein the electrolyte comprises water with a concentration of alkaline ions in the range of 0.1-1.0 M.

8. A process according to claim 7, wherein the alkaline ions are metal anions.

9. A process according to claim 8, wherein the metal anions are ions of sodium or potassium.

10. A process according to claim 8, wherein the electrolyte is formed by mixing water with hydroxide, chloride or carbonate forms of the metal anions.

11. A process according to claim 5, wherein the cathode comprises the cell body in contact with the electrolyte and the anode comprises a metal and is electrically isolated from the cell body.

12. A process according to claim 1, wherein the process includes a further step before step (b) of heating the solution by passing a current in the range 40 to 120 A, and more preferably 65 to 85 A, between two further electrodes electrically isolated from the anode and immersed within the solution.

13. A process according to claim 12, wherein the heating step heats the solution to a temperature of 50 to 100° C.

14. A process according to claim 12, wherein the first electrical potential is applied after the solution is heated.

* * * * *

UNITED STATES PATENT AND TRADEMARK OFFICE
CERTIFICATE OF CORRECTION

PATENT NO.        : 8,409,422 B2
APPLICATION NO.   : 12/992928
DATED             : April 2, 2013
INVENTOR(S)       : Robert Vancina It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 806 days.

Signed and Sealed this
First Day of September, 2015

Michelle K. Lee
*Director of the United States Patent and Trademark Office*